(12) United States Patent
Bunel et al.

(10) Patent No.: US 9,080,771 B2
(45) Date of Patent: Jul. 14, 2015

(54) COMBUSTION CHAMBER HAVING A VENTILATED SPARK PLUG

(75) Inventors: Jacques Marcel Arthur Bunel, Thiais (FR); Mario Cesar De Sousa, Cesson (FR); Guillaume Sevi, Ivry sur Seine (FR)

(73) Assignee: SNECMA, Paris (FR)

( * ) Notice: Subject to any disclaimer, the term of this patent is extended or adjusted under 35 U.S.C. 154(b) by 582 days.

(21) Appl. No.: 13/509,815

(22) PCT Filed: Nov. 15, 2010

(86) PCT No.: PCT/EP2010/067458
§ 371 (c)(1),
(2), (4) Date: May 15, 2012

(87) PCT Pub. No.: WO2011/061143
PCT Pub. Date: May 26, 2011

(65) Prior Publication Data
US 2012/0227373 A1    Sep. 13, 2012

(30) Foreign Application Priority Data
Nov. 17, 2009    (FR) ...................................... 09 58121

(51) Int. Cl.
*F02C 7/266*    (2006.01)
*F23R 3/06*    (2006.01)
*F23R 3/60*    (2006.01)

(52) U.S. Cl.
CPC . *F23R 3/06* (2013.01); *F02C 7/266* (2013.01); *F23R 3/60* (2013.01); *F05D 2260/30* (2013.01); *F23D 2207/00* (2013.01); *F23R 2900/03044* (2013.01); *Y02T 50/675* (2013.01)

(58) Field of Classification Search
CPC .... F23R 3/06; F23R 3/60; F23R 2900/03044; F23D 2207/00; F02C 7/266; F05D 2260/30
USPC ........ 60/39.821, 39.826, 39.827, 39.828, 752
See application file for complete search history.

(56) References Cited

U.S. PATENT DOCUMENTS 2,403,860 A * 7/1946 Heath ........................ 60/39.827
3,990,834 A   11/1976 DuBell et al.
(Continued)

FOREIGN PATENT DOCUMENTS

EP    1 741 982    1/2007
EP    1 770 332    4/2007
(Continued)

OTHER PUBLICATIONS

International Search Report Issued Feb. 22, 2011 in PCT/EP10/67458 Filed Nov. 15, 2010.

*Primary Examiner* — Phutthiwat Wongwian
*Assistant Examiner* — Lorne Meade
(74) *Attorney, Agent, or Firm* — Oblon, McClelland, Maier & Neustadt, L.L.P.

(57) ABSTRACT

A combustion chamber of a gas turbine engine including a wall, a well secured to the wall, the well forming a recess for a spark plug leading into the combustion chamber, and a spark-plug guide mounted on the well to be transversally mobile relative to the axis of the well, the spark-plug guide including a cylindrical wall portion for guiding and supporting the spark plug and a seal ring mounted such as to engage slidably with a bearing surface of the well. In the combustion chamber the spark-plug guide includes a cooling chamber having openings for supplying cooling air to the chamber.

6 Claims, 2 Drawing Sheets

(56) References Cited

U.S. PATENT DOCUMENTS

| | | | |
|---|---|---|---|
| 5,117,637 A * | 6/1992 | Howell et al. | 60/748 |
| 6,314,739 B1 * | 11/2001 | Howell et al. | 60/748 |
| 7,013,634 B2 * | 3/2006 | Pidcock et al. | 60/39.821 |
| 7,131,273 B2 * | 11/2006 | Howell et al. | 60/748 |
| 7,546,739 B2 * | 6/2009 | Holland et al. | 60/772 |
| 7,640,752 B2 * | 1/2010 | Gautier et al. | 60/796 |
| 7,721,545 B2 * | 5/2010 | Cayre et al. | 60/737 |
| 8,181,440 B2 * | 5/2012 | Sandelis | 60/39.821 |
| 2007/0051110 A1 | 3/2007 | Holland et al. | |
| 2007/0068166 A1 | 3/2007 | Gautier et al. | |
| 2009/0178385 A1 | 7/2009 | Sandelis | |

FOREIGN PATENT DOCUMENTS

| | | |
|---|---|---|
| FR | 2 244 083 | 4/1975 |
| FR | 2 926 329 | 7/2009 |

* cited by examiner

COMBUSTION CHAMBER HAVING A VENTILATED SPARK PLUG

BACKGROUND OF THE INVENTION

1. Field of the Invention

The present invention relates to the field of gas turbine engines and turbojets and pertains more particularly to the arrangement of a spark plug in the combustion chamber of this type of engine.

2. Description of the Related Art

In a gas turbine engine, the combustion chamber receives air from the compressor, a portion of which is mixed with the fuel and burned in the primary combustion zone. Ignition is provided by one or two spark plugs arranged downstream of the carburation system, and another portion of the air circulates around the primary combustion zone and is mixed with the primary combustion gases. All the hot gases are directed toward the turbine. Combustion chambers are designed to meet a number of required specifications, such as in-flight reignition, temperature profile form, pollutant gas emissions and also thermal and mechanical behavior of the various components thereof.

In particular, the ignition system has to guarantee in-flight re-ignition in the event of accidental extinguishing in the combustion chamber, while withstanding the thermal stresses imposed thereon; in particular, it must withstand those stresses. Such conditions involve arrangements that do not sit well together. Indeed, the injection system produces a layer of sprayed fuel that forms a certain angle with the chamber axis. If the latter is very closed, the spark plug is outside of the cone formed by the fuel; from the thermal behavior standpoint, this is favorable, but the ignition capabilities of the chamber are reduced. Conversely, an injection system in which the layer of fuel forms a very open cone gives rise to significant heating-up of that zone of the chamber that surrounds the spark plug owing to the impact of fuel on the walls and the spark plug. The thermal behavior of these elements is adversely affected thereby. Mounting of the spark plug generally takes these thermal conditions into account.

The present invention relates to ignition systems in which the spark plug is mounted on the combustion chamber casing, for example by means of a component forming an adapter that is itself affixed to the chamber casing. The spark plug, downstream of the fuel injection system, extends from the casing radially toward the inside of the chamber, and the end thereof is flush with the inner face of the chamber wall, via an aperture made in said wall.

During operation, lateral clearance is provided around the spark plug so as to allow the relative movements between the chamber and the casing that are the result of variations in temperature, pressures and stresses during different phases of a flight, without the spark plug, which is secured to the casing, abutting against or bearing on the edges of the aperture made in the chamber wall. The wall, at the opening, is provided with a cylindrical component that is reasonably high and forms a well into which the distal end of the spark plug is slipped, and a floating bushing forms a spark-plug guide. The spark-plug guide surrounds the spark plug such as to close the well and to guarantee the seal between the chamber and the zone outside of the chamber, between the chamber and the casing, and an example of this type of spark-plug mounting in a gas turbine engine combustion chamber is shown in the Applicant's patent application FR 2 926 329.

In addition to taking up the relative movements between the chamber and the casing, the well comprises ventilation openings for cooling the spark plug. Air enters from the outside of the combustion chamber, owing to the pressure difference, and maintains the temperature of the end of the spark plug, which is exposed to combustion gases and to the radiation thereof, at an acceptable level owing to the material of which it is composed. Insofar as the ventilation openings are made radially in the well wall, fine air jets form in the direction of the spark-plug surface. The cooling produced by the jets depends on various parameters, including the diameter of the openings and the distance from the latter to the jet impact surface.

However, cooling, which is optimum when the spark plug is at the center of the well, with all the jets traveling the same distance, may be of reduced efficiency when the spark plug is no longer in the center owing to variations in load between the chamber and the casing. Thermal transfers between the air jets and the impact wall, which are calibrated as rated, increase when the jet distance is shorter, on the one hand, and decrease, on the other, when the jet distance is longer than the predefined optimum distance.

BRIEF SUMMARY OF THE INVENTION

The subject matter of the invention is a means that makes it possible to maintain optimum cooling irrespective of the aircraft flight phase and the thermal variations between the combustion chamber and the casing that this involves.

According to the invention, this objective is achieved with a combustion chamber of a gas turbine engine including a wall, a well secured to the wall, the well forming a recess for a spark plug leading into the combustion chamber, a spark-plug guide mounted on the well such as to be transversely mobile relative to the axis of the well, the spark-plug guide including a cylindrical wall portion for axially guiding the spark plug and a seal ring mounted such as to bear slidably on a bearing surface provided on the well, characterized in that the spark-plug guide is provided with a cooling chamber having openings for supplying cooling air, said chamber being arranged such as to provide cooling by impact on the wall of the spark plug housed in the spark-plug guide.

By moving the cooling chamber, swept by the cooling air jets, to the level of the spark-plug guide, cooling of the impact surface is made independent of expansion variations between the chamber and its environment. Indeed, the spark-plug guide follows the movements of the spark plug in the well and the dimensions of the cooling chamber do not vary.

According to a preferred embodiment, the cooling chamber is annular and coaxial with said cylindrical wall portion of the spark-plug guide. This guarantees cooling of the area around the spark plug. More particularly, the cooling chamber is arranged between said cylindrical wall portion of the spark-plug guide and the combustion chamber. It is, in particular, provided between the cylindrical wall portion of the spark-plug guide and the seal ring.

In order to ensure a sufficient cooling air supply, the cooling air supply openings are preferably oriented radially and perpendicularly to the axis of the cylindrical wall portion of the spark-plug guide.

However, with a view to taking account of a particular geometry of the spark-plug guide and of the constraint of a narrow environment that likewise limits the volume of the obstacle in the flow, the cooling air supply openings are oriented so as to be inclined relative to the axis of the cylindrical wall portion.

BRIEF DESCRIPTION OF THE SEVERAL VIEWS OF THE DRAWINGS

The invention will be better understood and further objects, details, features and advantages thereof will become more clearly apparent in the course of the following detailed explanatory description of several embodiments of the invention, which are given by way of purely illustrative and non-limiting examples, with reference to the appended schematic drawings.

In those drawings.

DETAILED DESCRIPTION OF THE INVENTION

Figure 1:
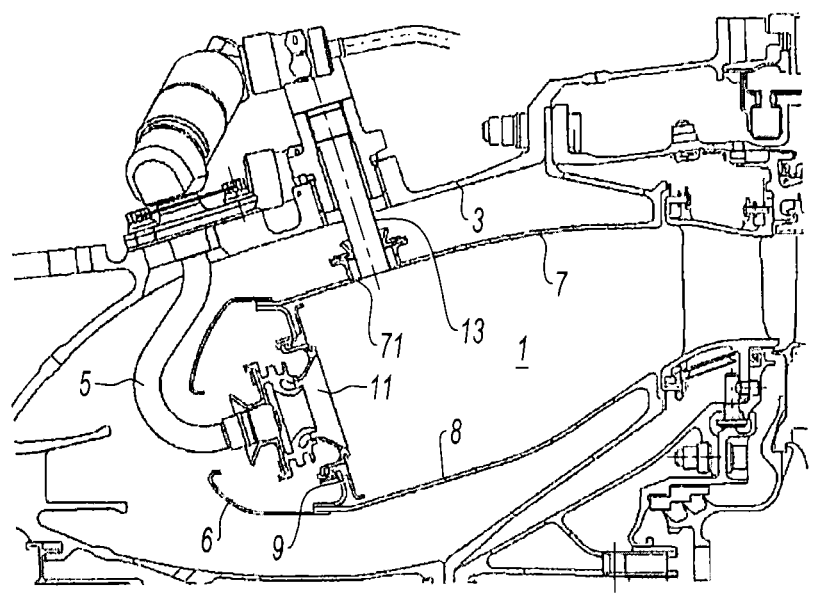
FIG. 1 shows a longitudinal section of a part of a gas turbine engine combustion chamber according to the prior art.

As may be seen in FIG. 1, the combustion chamber 1 is contained in an annular space about the axis of the engine formed by an outer casing 3. It comprises one or more external ferrules 7 and one or more internal ferrules 8 held together by flanges or appropriate supports, and the chamber is closed upstream by a chamber end wall 9 associated with upstream fairings 6. Fuel-injection pipes 5 are distributed about the axis of the engine and open out inside the chamber via apertures made in the chamber end wall 9. Deflectors 11 form a bowl around each fuel-injection pipe, deflecting a portion of the air that has entered the faired zone in a swirling, radial direction toward the sprayed fuel, and thus ensure the formation of a fuel/air mix, with a primary combustion zone being formed immediately downstream of the chamber end wall where the mix is ignited by an electric spark plug 13 or a number of spark plugs distributed generally circumferentially.

Figure 2:
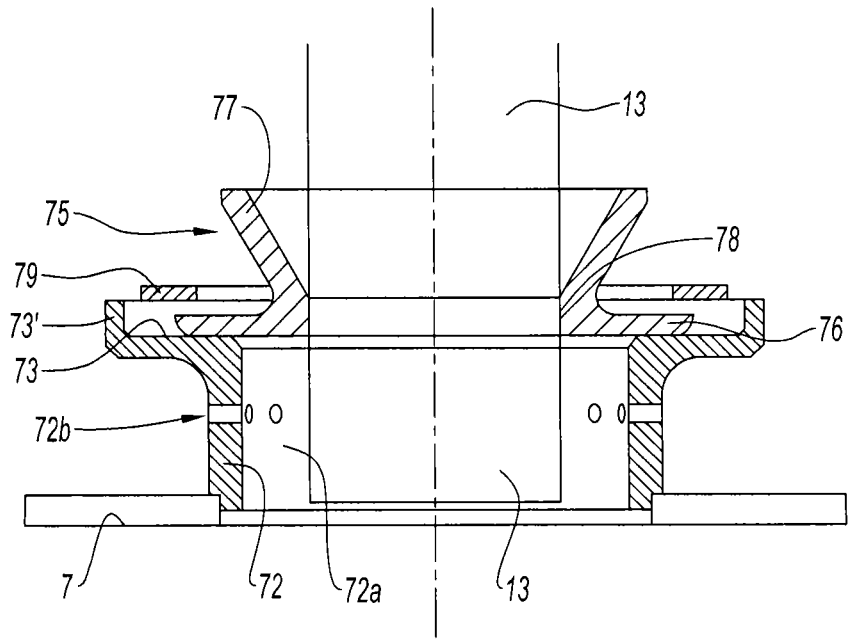
FIG. 2 shows the detail of the zone, according to the prior art, where a spark plug is flush with a well and a spark-plug guide as shown in FIG. 1.

FIG. 2 shows, in section, the detail of the zone of the combustion chamber that includes an aperture for the passage of a spark plug. The external ferrule 7, for example, is pierced by a circular hole 71 around which a cylindrical tube 72 is mounted, which is oriented radially relative to the outer wall 7. This tube forms a well through which the spark plug 13 passes. This well comprises an upper bearing surface 73 in a plane perpendicular to the axis of the well, bordered by a raised surface 73'. The spark-plug guide 75 rests on this surface 73. The spark-plug guide comprises a ring 76 and an insertion cone 77 around a cylindrical guide portion 78. The spark-plug guide 75 rests on the bearing surface 73 via the ring 76. The latter is able to slide on this surface between the raised surfaces 73'. A dish 79, welded to the raised surface 73', holds the ring 76 radially against any radial displacement beyond the raised surface 73'. The cylindrical surface portion 78 has a diameter that is barely greater than that of the spark plug. The latter can therefore slide relative to the spark-plug guide 75. The conical surface 77 is designed to facilitate insertion of the spark plug in the spark-plug guide at the time of mounting of the chamber. The spark-plug guide thus closes the annular space between the spark plug and the well. This annular space is supplied, furthermore, with air via openings 72B oriented toward the spark-plug surface.

An assembly such as this makes it possible to match relative displacements arising from thermal variations and the like between the chamber and the casing. The spark-plug guide 75 is able to move, thus, along the bearing surface 73 inside the raised surface 73'. It will be noted that the annular space between the spark plug 13 and the well is not constant. When the spark plug is displaced against the well, the annular space around the spark plug varies between a zero value and a value that is double the annular space at rest, and it follows that the cooling efficiency of the air jets passing through the openings 72B is non-uniform, which is undesirable.

The solution of the invention makes it possible to maintain effective cooling by impact all around the spark plug.

Figure 3:
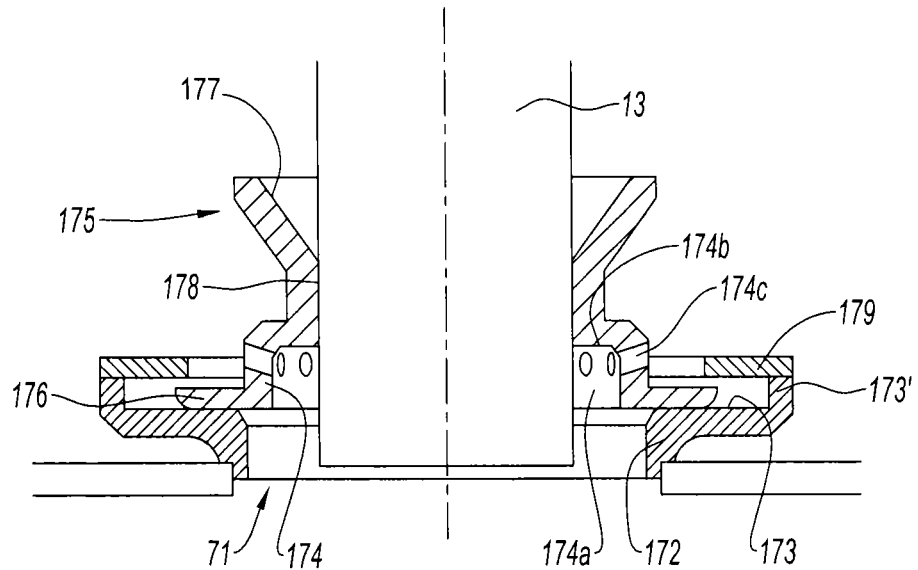
FIG. 3 shows an embodiment of the invention with an improved spark-plug guide.
Figure 4:
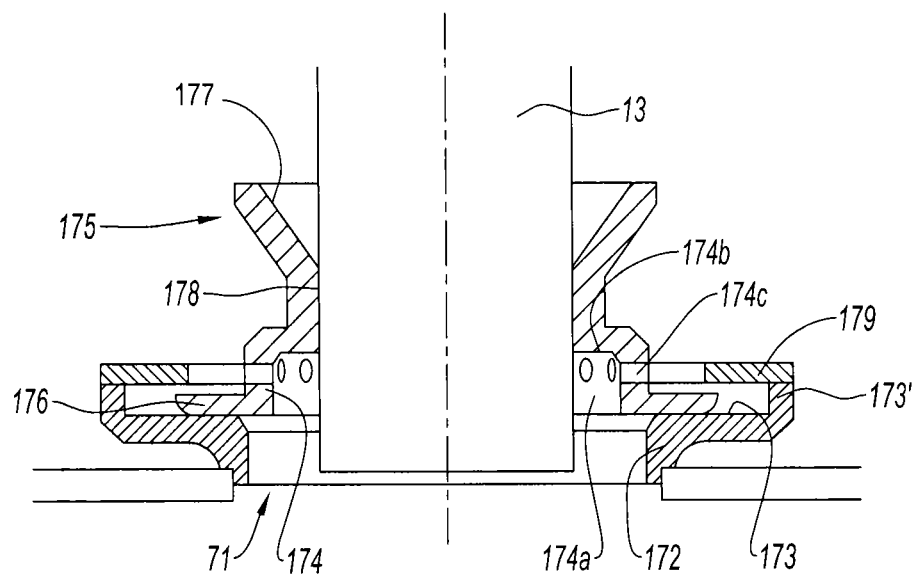
FIG. 4 shows another embodiment of the invention with an improved spark-plug guide.

Examples of a solution are shown in FIG. 3 and FIG. 4. The assembly of FIG. 3 and the assembly of FIG. 4 each reproduces the same references as in FIG. 2, which are increased by 100 in the case of similar parts.

The spark plug 13 is guided in the well 172 by a spark-plug guide 175. Once again, there is the bearing surface 173 of the well with the raised surface 173' and the dish 179 allowing movement of the spark-plug guide in a limited space.

The spark-plug guide 175 according to the invention includes the ring 176 for bearing against the bearing surface of the well. The cylindrical guide surface portion 178 of an inside diameter adapted to that of the spark plug to allow tight sliding of the spark plug in this cylindrical portion. Once again there is also the frustoconical surface portion 177 that retains the function of facilitating insertion of the spark plug into the spark-plug guide and the well.

This spark-plug guide 175 of the invention includes a cylindrical cooling surface portion 174 between the cylindrical guide surface portion 178 and the ring 176. This cylindrical cooling surface portion 174 has a diameter greater than that of the cylindrical guide surface portion 178. A cooling chamber 174a is thus provided in the surface of the spark plug opposite the surface 174 and a radial surface portion 174b connecting the two surfaces 174 and 178. The chamber is open toward the combustion chamber, only the outer wall of which is given a reference number.

Openings 174c are pierced in the cooling surface portion 174. These openings are oriented such that their bore is clear and allows air to circulate without significant obstacles. In the embodiment shown, the openings are inclined relative to the spark-plug impact surface; the air jets have a speed component directed toward the combustion chamber. According to a further embodiment shown in FIG. 4, in which the cylindrical cooling surface portion is taller, the openings are oriented perpendicularly to the spark-plug impact surface.

When the combustion chamber is operating, the spark plug is flush with the inner surface of the combustion chamber wall, i.e. the distal face thereof is substantially in the plane of the chamber wall. The diameters of the holes calibrate the injected air and the distance separating the wall portion 174 from the spark-plug surface has been determined such that cooling by air-jet impact on the spark plug is optimum. In the various operating phases, the spark plug, which is secured to the casing, has to move relative to the combustion chamber wall. However, insofar as the spark-plug guide 175 follows the displacements of the spark plug, the conditions of the cooling thereof are not modified and efficiency is unaffected.

The invention claimed is:

1. A combustion chamber of a gas turbine engine comprising:
   a wall;
   a well secured to the wall, the well forming a recess for a spark plug leading into the combustion chamber;
   a spark-plug guide mounted on the well, the spark-plug guide is transversely mobile relative to an axis of symmetry of the well, the spark-plug guide including a cylindrical guide wall portion for guiding the spark plug, a seal ring mounted to bear slidably on a bearing surface of the well, a cylindrical cooling surface portion disposed between the guide wall portion and the seal ring, and a radial surface portion connecting the guide wall portion and the cooling surface portion, wherein the spark-plug guide includes a cooling chamber delimited by the cooling surface portion and the radial surface portion, the cooling chamber including openings provided on the cooling surface portion for supplying cooling air to the cooling chamber, the cooling chamber providing cooling by impact on an exterior impact surface of the spark plug housed in the spark-plug guide, wherein an inner diameter of the cooling surface portion is greater than an inner diameter of the guide wall portion, and wherein a first end of the cooling surface portion is connected to the radial surface portion and a second end of the cooling surface portion is connected to the seal ring.

2. The combustion chamber as claimed in claim 1, wherein the cooling chamber is annular, the cooling chamber and the cylindrical guide wall portion being coaxial.

3. The combustion chamber as claimed in claim 1, wherein the cooling chamber is arranged between the cylindrical guide wall portion and the combustion chamber.

4. The combustion chamber according to claim 1, wherein the cooling air supply openings of the cooling chamber are oriented perpendicularly to an axis of the cooling surface portion.

5. The combustion chamber as claimed in claim 1, wherein the cooling air supply openings are inclined relative to an axis of the cooling surface portion.

6. The combustion chamber as claimed in claim 1, wherein a dish is welded to a raised surface of the well bordering the bearing surface of the well, the dish including an opening through which the cylindrical cooling surface portion passes.

* * * * *